US008112085B2

(12) United States Patent  
Salokannel et al.

(10) Patent No.: US 8,112,085 B2
(45) Date of Patent: Feb. 7, 2012

(54) ANCHOR SELECTION IN DISTRIBUTED NETWORKS

(75) Inventors: Juha Salokannel, Tampere (FI); Janne Tervonen, Espoo (FI); Janne Marin, Espoo (FI)

(73) Assignee: Nokia Corporation, Espoo (FI)

( * ) Notice: Subject to any disclaimer, the term of this patent is extended or adjusted under 35 U.S.C. 154(b) by 1030 days.

(21) Appl. No.: 11/615,150

(22) Filed: Dec. 22, 2006

(65) Prior Publication Data

US 2008/0153493 A1 Jun. 26, 2008

(51) Int. Cl.
*H04W 36/00* (2009.01)
(52) U.S. Cl. .................. 455/436; 455/446; 455/550.1; 455/561
(58) Field of Classification Search .............. 455/69, 455/436, 403, 517, 67; 370/331, 315, 342, 370/402, 347, 338
See application file for complete search history.

(56) References Cited

U.S. PATENT DOCUMENTS

| | | | | |
|---|---|---|---|---|
| 2002/0042274 | A1* | 4/2002 | Ades | 455/445 |
| 2004/0100929 | A1* | 5/2004 | Garcia-Luna-Aceves | 370/338 |
| 2005/0055720 | A1* | 3/2005 | Atad et al. | 725/68 |
| 2005/0120136 | A1* | 6/2005 | Park et al. | 709/242 |
| 2006/0018280 | A1* | 1/2006 | Kumar et al. | 370/331 |
| 2006/0058056 | A1* | 3/2006 | Das et al. | 455/524 |
| 2007/0066297 | A1* | 3/2007 | Heidari-Bateni | 455/423 |
| 2007/0110015 | A1* | 5/2007 | Chakraborty et al. | 370/338 |
| 2007/0223410 | A1* | 9/2007 | Oyama et al. | 370/310 |
| 2008/0089287 | A1* | 4/2008 | Sagfors et al. | 370/331 |

OTHER PUBLICATIONS

"Distributed Medium Access Control (MAC) for Wireless Networks", Version 1.0, (Dec. 8, 2005), 182 pgs.
"WiMedia Networking Protocol", WiMedia Alliance, Draft 0.87, (Oct. 19, 2006), 79 pgs.

* cited by examiner

*Primary Examiner* — Nick Corsaro
*Assistant Examiner* — Mahendra Patel

(57) ABSTRACT

Various embodiments are described relating to selecting anchor nodes among nodes in a wireless network. In an example embodiment, a topological arrangement of a first wireless node and one or more other wireless nodes neighboring to the first wireless node in a wireless network may be determined by the first wireless node. A second wireless node may be selected to perform anchor node operations for the first wireless node based on the determined topological arrangement. For example, the first wireless node may select itself to perform the anchor node operations based on the determined topological arrangement.

32 Claims, 11 Drawing Sheets

| Octets: 1 | 1 | 1 | K | 2 | ... | 2 |
|---|---|---|---|---|---|---|
| Element ID | Length | BP Length | Beacon Slot Info Bitmap | DevAddr 1 | ... | DevAddr N |

ANCHOR SELECTION IN DISTRIBUTED NETWORKS

BACKGROUND

As wireless technology has advanced, a variety of wireless networks have been installed, such as cellular and other wireless networks. Some wireless networks are based upon the Institute of Electrical and Electronics Engineers (IEEE) 802.11 family of Wireless LAN (WLAN) industry specifications, for example. As another example, some wireless networks are based upon the Distributed Medium Access Control (MAC) for Wireless Networks industry specifications of the WiMedia Alliance, for example. For example, the WiMedia network protocol adaptation (WiNet) layer is a protocol adaptation layer (PAL) that builds on a WiMedia ultra-wideband (UWB) common radio platform to augment the convergence platform with TCP/IP services. A number of working groups are working to improve on this technology.

An example standard, for example, the Distributed Medium Access Control (MAC) for Wireless Networks of the WiMedia Alliance, defines a distributed medium access control (MAC) sublayer for wireless networks, and further specifies a wireless network structure that does not require an existing infrastructure for communication such as, for example, a WiMedia ultra-wideband (UWB) network.

Categories of example applications considered for such an example standard may include portable electronic devices intended to be carried by a user, home electronics equipment, and personal computers and peripherals. Example portable electronic devices may have specific requirements to support mobility and good power efficiency. Devices such as home electronics and computers may not be as mobile, and not as sensitive to power efficiency as such portable electronic devices. All of these devices may benefit from a zero-infrastructure environment.

An interval, for example, a periodic time interval may be used to coordinate frame transmissions between devices, for example, a superframe interval may be used which includes a beacon period followed by a data period. The beacon period may include multiple beacon slots which may be used by multiple devices to send beacons.

In an example network formed with fully distributed medium access coordination, logical groups may be formed around each device in the network to facilitate contention-free frame exchanges while exploring medium reuse over different spatial regions. These logical groups may include, for example, a beacon group and an extended beacon group, both of which may be determined with respect to an individual device. For example, a beacon group may include a set of devices from which a device receives beacons that identify the same beacon period start time (BPST) as the device. An extended beacon group may include a union of a device's beacon group and the beacon groups of all devices in the device's beacon group.

When a device is enabled, it may scan one or more channels for beacons and select a communications channel. If no beacons are detected in the selected channel, the device may create its own beacon period (BP) by sending a beacon. If one or more beacons are detected in the selected channel, the device may synchronize its BP to existing beacons in the selected channel. The device may then exchange data with members of its beacon group using the same channel the device selected for beacons.

An example WiMedia standard also defines a dynamic beaconing technique, which enables devices in a distributed network to maintain fast connectivity. Devices may maintain synchronization with each other by participating in a beacon period, for example, by each device sending its own beacon and listening to other devices' beacons once in each superframe (e.g., 65.536 ms). The rest of the time the devices may send data to each other or hibernate, or sleep.

If a group of devices moves into the range of another group of devices, the groups may need to synchronize to each other before connectivity from one group to another may be available for the devices, and before channel time reservations may be handled without collisions. A group of devices may thus be viewed as "one device" or "two or more devices participating in the same beacon group," for example, devices having the same beacon period start time (BPST).

Establishing synchronization between the groups may involve regular scanning activities. Scanning may be performed at a device by listening to the channel, for example, for at least the time associated with one superframe occasionally. The scanning may be repeated based on an expectation of the connectivity speed. For example, if one superframe time is scanned once every second, the new devices or groups of devices on the same communications channel may be found on average in half a second when they enter the operating range.

In example networks such as a WiMedia network, synchronization may be maintained by devices participating in a beaconing period in every superframe. However, devices using low power mode, or hibernation mode, may need to rely on other devices to maintain the network synchronization; otherwise devices may forfeit their saved power to a need to scan the channels for synchronization. Thus, for example, a network device may indicate that it will perform anchoring operations, or operate as an anchor node or anchor device, and may thereby indicate a promise to one or more other nodes to remain active and to maintain network synchronization.

A role of anchor device may be switched among network nodes over time; however, if two nodes determine that one of the nodes should perform anchor node operations for the other, there may be other nodes in the network that may lose synchronization capability if the non-anchor node enters a hibernation state, for example, due to a topology of the network. For example, networks that include multiple hops may lose connectivity depending on whether certain nodes may become inactive for a period of time, and thus may lose network synchronization.

SUMMARY

Various embodiments are described relating to selecting anchor nodes among nodes in a wireless network.

According to an example embodiment, a topological arrangement of a first wireless node and one or more other wireless nodes neighboring to the first wireless node in a wireless network may be determined by the first wireless node. A second wireless node may be selected to perform anchor node operations for the first wireless node based on the determined topological arrangement. According to an example embodiment, the selecting may include the first wireless node selecting itself as the second wireless node to perform anchor node operations for the first wireless node based on the determined topological arrangement.

According to another example embodiment, a first wireless node may determine that a first set of one or more other wireless nodes including a first neighboring anchor node is in a receiving range of the first wireless node in a wireless network. One or more indicators indicating that a second set of one or more wireless nodes is in a receiving range of the first neighboring anchor node may be received from the first neighboring anchor node by the first wireless node. A second wireless node may be selected to perform anchor node operations for the first wireless node based on comparing the first and second sets. According to an example embodiment, selecting the second wireless node may include the first wireless node selecting itself as the second wireless node to perform anchor node operations for the first wireless node based on determining whether each of the wireless nodes included in the first set is in a receiving range of the first neighboring anchor node based on comparing the first and second sets.

In another example embodiment, an apparatus for wireless communications may include a controller, a memory coupled to the controller, and a wireless transceiver coupled to the controller. The apparatus may be adapted to determine a topological arrangement of the apparatus and one or more other wireless nodes neighboring to the apparatus in a wireless network, and select a wireless node to perform anchor node operations for the apparatus based on the determined topological arrangement. According to an example embodiment, the apparatus may be adapted to determine the topological arrangement based on determining a first set of one or more wireless nodes other than the apparatus that is in a receiving range of the apparatus, the first set including a first neighboring anchor node, and receiving from the first neighboring anchor node one or more indicators indicating a second set of one or more wireless nodes that is in a receiving range of the first neighboring anchor node.

In another example embodiment, an apparatus for wireless communications may include a controller, a memory coupled to the controller, and a wireless transceiver coupled to the controller. The apparatus may be adapted to determine that a first set of one or more wireless nodes including a first neighboring anchor node is in a receiving range of the apparatus in a wireless network, receive from the first neighboring anchor node one or more indicators indicating that a second set of one or more wireless nodes is in a receiving range of the first neighboring anchor node, and select one of the wireless nodes included in the first or second sets to perform anchor node operations for the apparatus based on comparing the first and second sets. According to an example embodiment, the apparatus may be adapted to select the wireless node to perform anchor node operations for the apparatus based on determining whether each of the wireless nodes included in the first set other than the first neighboring node is in a receiving range of the first neighboring anchor node based on comparing the first and second sets.

BRIEF DESCRIPTION OF THE DRAWINGS

FIG. 5 is an example format of a beacon period occupancy information element included in an example beacon according to an example embodiment.

DETAILED DESCRIPTION

Figure 1A:
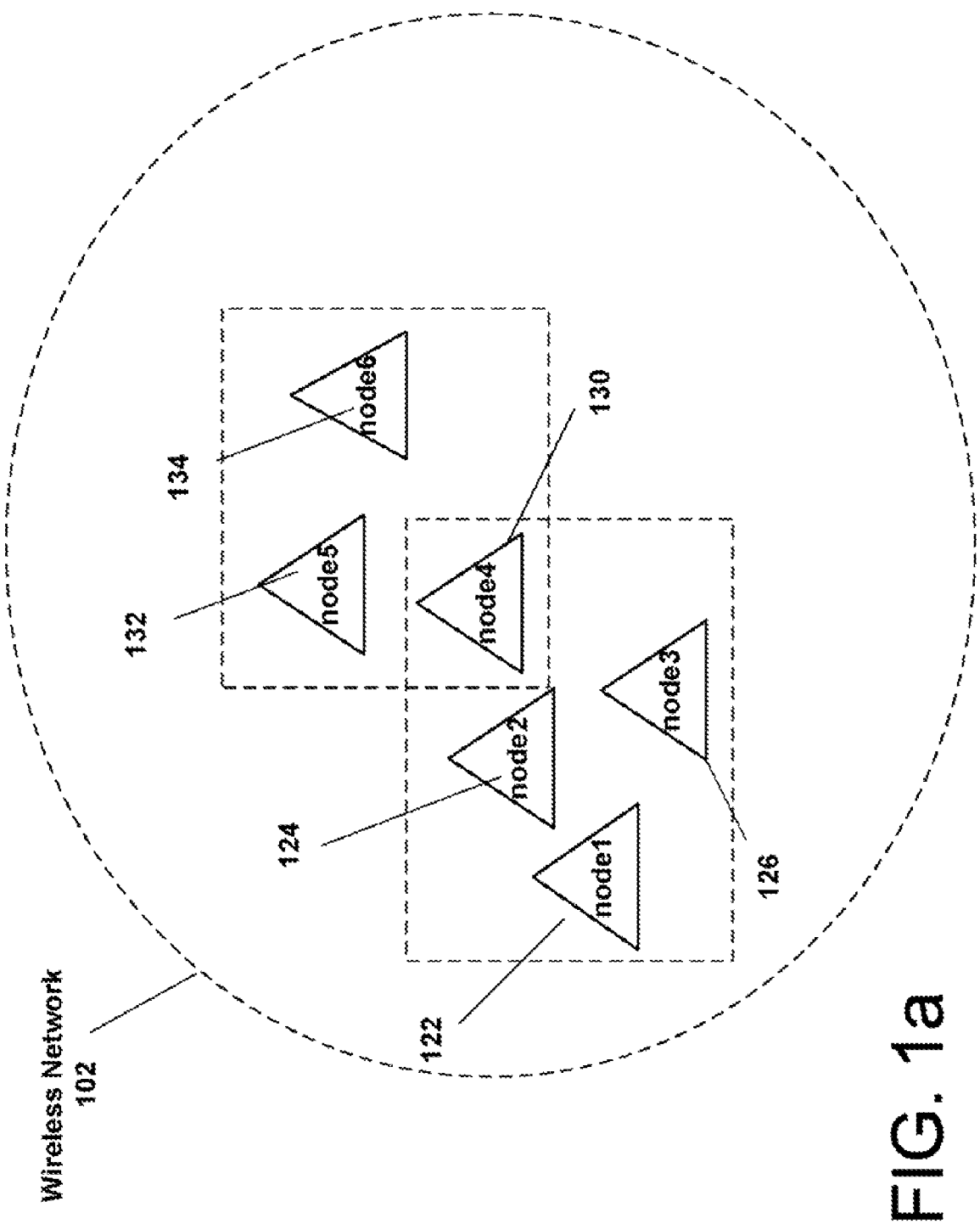
FIGS. 1a-1b are diagrams of example configurations of beacon groups of a wireless network according to an example embodiment.
Figure 1B:
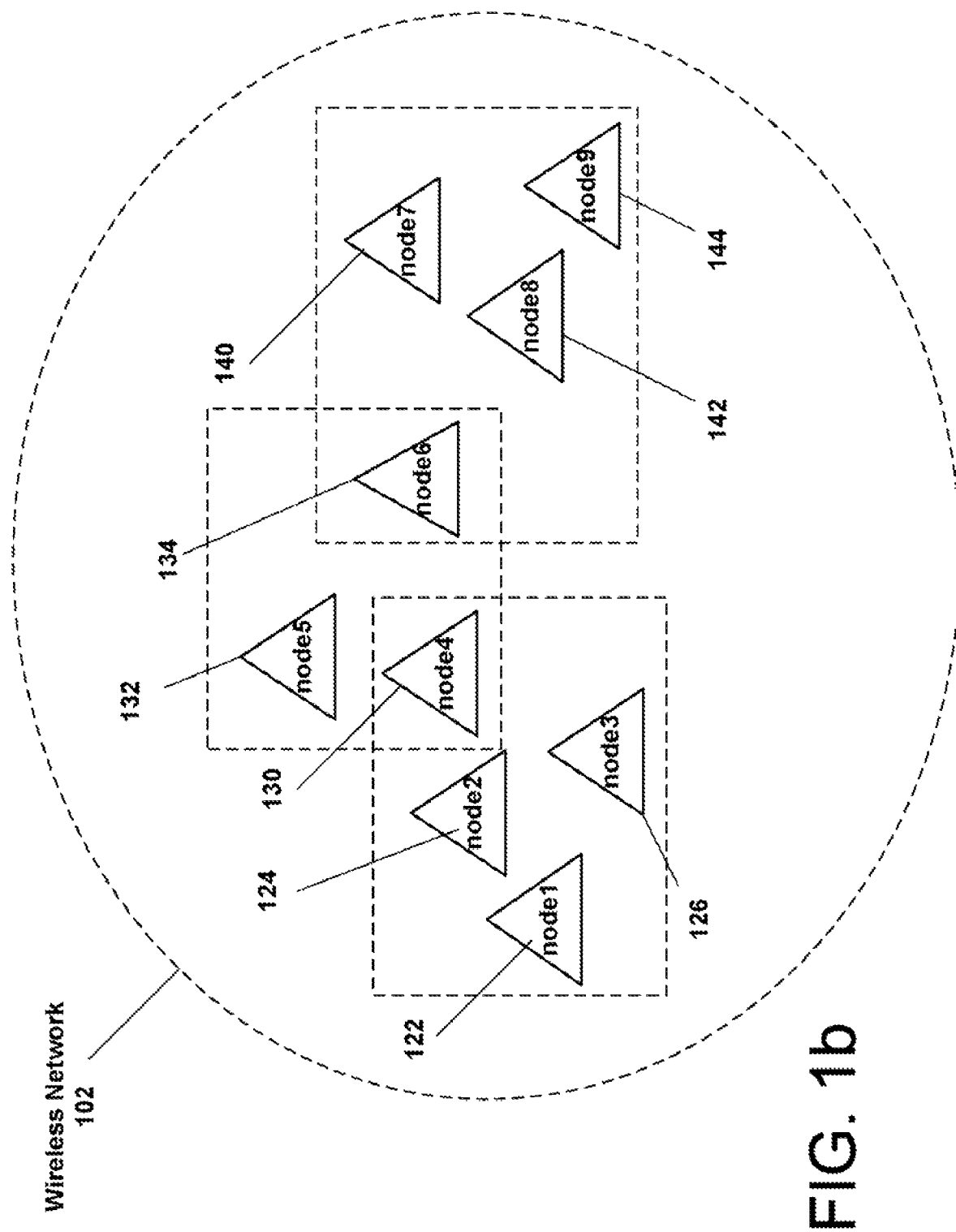

Referring to the Figures in which like numerals indicate like elements, FIGS. 1a-1b are diagrams of example configurations or topologies of beacon groups of a wireless network 102 according to an example embodiment. The term "node" or "wireless node" or "network node" or "network station" may refer, for example, to a wireless station, e.g., a subscriber station or mobile station, an access point or base station, a relay station or other intermediate wireless node, or other wireless computing devices, such as laptop computers, desktop computers, and peripheral devices, as examples. The term "topology" or "network topology" or "topological arrangement" may refer, for example, to an arrangement of network nodes with respect to one another. For example, a "topology" or "topological arrangement" may refer to an arrangement of nodes that may be within radio range of one another, or that may include some nodes that are in range of one another and not in range of others. A "topology" or "topological arrangement" may also include nodes that are performing anchor operations for other nodes, and are thus within range of the other nodes.

As shown in FIG. 1a, a wireless network node node1 122 is in range of, and thus may receive messages from, nodes node2 124, node3 126, and node4 130. Thus, the nodes node1 122, node2 124, node3 126, and node4 130 may be referred to herein as "neighbor nodes" or "neighboring nodes." Moreover, a node5 132 and node6 134 are also in range of, and may receive messages from, the node4 130. Thus, node 4 130 may be a neighbor node with node5 132 and node6 134. Further, each of node2 124, node3 126, and node4 130 are in range of each other, and may receive messages from among themselves. Thus, for example, node1 122, node2 124, node3 126, and node4 130 may be included in a common beacon group. However, node1 122 and node node5 132, as shown in FIG. 1a, are not in range of each other, and thus may not receive messages from each other directly, and are thus not currently neighbor nodes to each other. Thus, for example, the node node4 130 may send messages to, or receive messages from, any of the nodes node1 122, node2 124, node3 126, node5 132, and node6 134. Thus, node4 130, node5 132, and node6 134 may also be included in a common beacon group. For example, node4 130, node5 132, and node6 134 may be included in the same beacon group as node1 122, node2 124, node3 126, and node4 130, for example, an extended beacon group. Therefore, if, for example, node4 130 were to perform anchor node operations to maintain network synchronization, all of node1 122, node2 124, node3 126, node5 132, and node6 134 may be able to reduce their scanning operations on the medium and rely on synchronization information from the node4 130.

This example reduction of synchronization activity may thus result in a substantial reduction of power consumption by the non-anchor nodes.

As shown in FIG. 1b, the wireless network node node6 134 is in range of, and thus may receive messages from, node7 140, node8 142, and node9 144. However, the nodes node7 140, node8 142, and node9 144 may be included in a different beacon group from the beacon group of node6 134. Moreover, transmissions sent by node7 140, node8 142, and node9 144 may not be received by any of node1 122, node2 124, node3 126, node4 130, or node5 132. Thus, over time, network synchronization may be lost. However, if node6 134 is selected to operate as an anchor node for node7 140, node8 142, and node9 144, as well as for node4 130 and node5 132, the network synchronization may at least be maintained for this particular group of nodes. Further, if node4 130 is selected to operate as an anchor node for node1 122, node2 124, and node3 126, then all nodes in the wireless network 102, as shown in FIG. 1b, may be covered by one or more anchor nodes to maintain network synchronization.

If, for example, any of nodes node7 140, node8 142, and node9 144 were to move within the operating range of node6 134, then any of the affected nodes may change their beacon group according to WiMedia protocol. One skilled in the art of wireless communications would understand that nodes may change beacon groups for many different reasons.

As discussed below, power consumption caused by scanning a medium of a wireless network may be reduced, for example, by advantageously selecting anchor nodes for a particular network node to ensure that all network nodes neighboring to the particular node are covered by neighboring anchor nodes as discussed further below.

Figure 2:
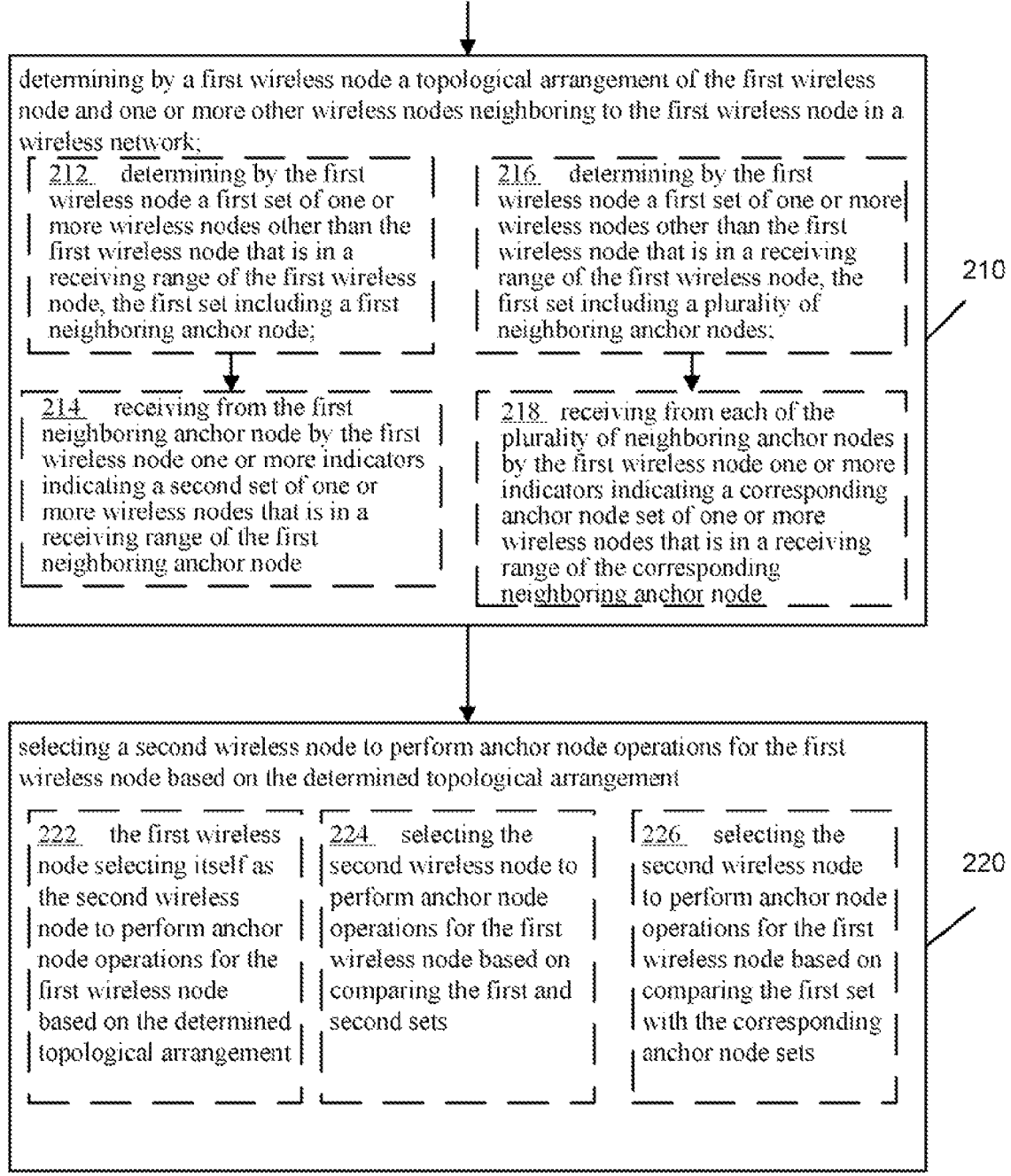
FIG. 2 is a flow chart illustrating operation of selecting a node to perform anchor node operations for a first node of a wireless network according to an example embodiment.

FIG. 2 is a flow chart illustrating operation of a first node in selecting an anchor node, for example, to maintain network synchronization for the first node of a wireless network according to an example embodiment. A topological arrangement of a first wireless node and one or more other wireless nodes neighboring to the first wireless node in a wireless network may be determined by the first wireless node (210). For example, a topological arrangement of node2 124 and nodes neighboring to node2 124 may be determined by node2 124. For example, node2 124 may determine that its neighbors include node1 122, node3 126, and node4 130. Node2 124 may further determine that node4 130 is operating as an anchor node in the network. For example, node2 124 may determine the topological arrangement based on beacons received from the neighbor nodes of node2 124. For example, the beacons may include beacon period occupancy information elements (BPOIEs) that include information regarding neighbors of each sending wireless node.

According to an example embodiment, a first set of one or more wireless nodes other than the first wireless node that is in a receiving range of the first wireless node, the first set including a first neighboring anchor node, may be determined by the first wireless node (212). For example, node2 124 may determine that node4 130 is operating as an anchor node in the network. For example, node4 130 may send a beacon including an BPOIE as discussed below with regard to FIG. 5 to node2 124, including an indication that node4 130 is an anchor node.

According to an example embodiment, one or more indicators indicating a second set of one or more wireless nodes that is in a receiving range of the first neighboring anchor node may be received from the first neighboring anchor node by the first wireless node (214). For example, node2 124 may receive from node4 130 one or more indicators indicating that node1 122, node2 124, node3 126, node5 132, and node6 134 are in a receiving range of node4 130.

According to an example embodiment, the first wireless node may determine a first set of one or more wireless nodes other than the first wireless node that is in a receiving range of the first wireless node, the first set including a plurality of neighboring anchor nodes (216). For example, node2 124 may determine that node3 126 and node4 130 are neighboring anchor nodes.

One or more indicators indicating a corresponding anchor node set of one or more wireless nodes that are in a receiving range of the corresponding neighboring anchor node may be received from each of the plurality of neighboring anchor nodes by the first wireless node (218). For example, node2 124 may receive the indicators indicating corresponding anchor node sets from both node3 126 and node4 130.

According to an example embodiment, a second wireless node may be selected to perform anchor node operations for the first wireless node based on the determined topological arrangement (220). According to an example embodiment, the selecting may include the first wireless node selecting itself as the second wireless node to perform anchor node operations for the first wireless node based on the determined topological arrangement (222). According to an example embodiment, the second wireless node may include the first wireless node. Thus, for example, the node2 124 may select itself to perform anchor operations for itself based on the determined topological arrangement. Therefore, node2 124 may select itself to remain awake and perform anchor operations, for example, to maintain network synchronization, for example, for itself and for wireless nodes neighboring to node2 124 in the wireless network.

According to an example embodiment, the second wireless node may be selected to perform anchor node operations for the first wireless node based on comparing the first and second sets (224). Thus, for example, since the second set of wireless nodes discussed above includes all of the neighbors of node2 124, then node4 130 may be selected to perform anchor operations for node2 124. For example, node2 124 may select node4 130 to perform the anchor node operations for node2 124, and node4 130 may then act as an anchor for node2 124.

According to an example embodiment, the second wireless node may be selected to perform anchor node operations for the first wireless node based on comparing the first set with the corresponding anchor node sets (226). Thus, for example, since the anchor node sets discussed above includes all of the neighbors of node2 124, then node4 130 may be selected to perform anchor operations for node2 124.

Figure 3:
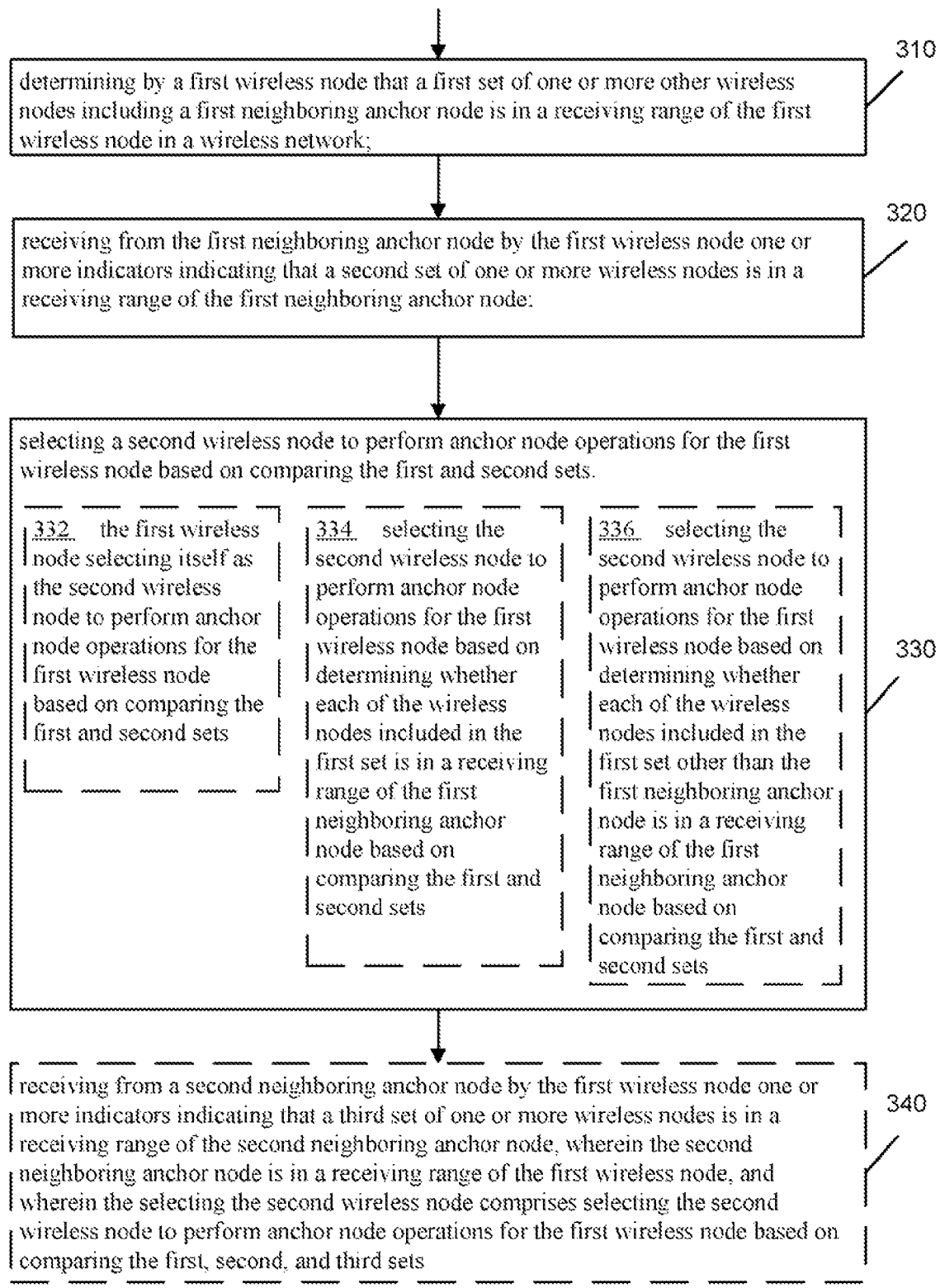
FIG. 3 is a flow chart illustrating operation of selecting a node to perform anchor node operations for a first node of a wireless network according to an example embodiment.

FIG. 3 is a flow chart illustrating operation of selecting an anchor node, for example, to maintain network synchronization for the first node of a wireless network according to an example embodiment. At 310, it may be determined by a first wireless node that a first set of one or more other wireless nodes including a first neighboring anchor node is in a receiving range of the first wireless node in a wireless network. For example, node2 124 may determine that its neighbors include node1 122, node3 126, and node4 130. Further, node2 124 may determine that its neighbor node4 130 is a neighboring anchor node maintaining synchronization in the wireless network 102. For example, node4 130 may send a beacon including an BPOIE as discussed below with regard to FIG. 5 to node2 124, including an indication that node4 130 is an anchor node.

According to an example embodiment, one or more indicators indicating that a second set of one or more wireless nodes is in a receiving range of the first neighboring anchor node may be received from the first neighboring anchor node by the first wireless node (320). For example, node2 124 may receive from node4 130 one or more indicators indicating that node1 122, node2 124, node3 126, node5 132, and node6 134 are in a receiving range of node4 130.

According to an example embodiment, a second wireless node may be selected to perform anchor node operations for the first wireless node based on comparing the first and second sets (330). For example, node4 130 may be selected to perform anchor operations for node2 124 based on comparing the set of neighbors of node2 124 and the set of neighbors of node4 130. For example, node2 124 may select itself to perform anchor operations for itself based on comparing the set of neighbors of node2 124 and the set of neighbors of node4 130.

According to an example embodiment, selecting the second wireless node may include the first wireless node selecting itself as the second wireless node to perform anchor node operations for the first wireless node based on determining whether each of the wireless nodes included in the first set is in a receiving range of the first neighboring anchor node based on comparing the first and second sets (332). For example, node2 124 may select itself to perform anchor operations for itself based on comparing the set of neighbors of node2 124 and the set of neighbors of node4 130.

According to an example embodiment, the second wireless node may be selected to perform anchor node operations for the first wireless node based on determining whether each of the wireless nodes included in the first set is in a receiving range of the first neighboring anchor node based on comparing the first and second sets (334). For example, node2 124 may select node4 130 to perform anchor node operations for node2 124 based on determining that all of the neighbors of node2 124 are included in the set of neighbors of node4 130.

According to an example embodiment, the second wireless node may be selected to perform anchor node operations for the first wireless node based on determining whether each of the wireless nodes included in the first set other than the first neighboring anchor node is in a receiving range of the first neighboring anchor node based on comparing the first and second sets (336).

According to an example embodiment, one or more indicators indicating that a third set of one or more wireless nodes is in a receiving range of the second neighboring anchor node may be received from a second neighboring anchor node by the first wireless node, wherein the second neighboring anchor node is in a receiving range of the first wireless node, and wherein selecting the second wireless node comprises selecting the second wireless node to perform anchor node operations for the first wireless node based on comparing the first, second, and third sets (340). For example, node2 124 may determine that node3 126 and node4 130 are neighboring anchor nodes. For example, node2 124 may receive indicators indicating corresponding anchor node sets from both node3 126 and node4 130. Node2 124 may then select a node to perform anchor node operations for node2 124 based on comparing the three sets of wireless nodes, for example, to ensure that all neighbors of node2 124 are covered by neighboring anchor nodes.

According to an example embodiment, a determination may be made of feasibility for the first node to perform anchor node operations for the network based on a determination of a power source of the first node, such as a mains or an AC power source for node2 124. Thus, for example, a first node may significantly reduce the power consumption of neighboring wireless nodes in the wireless network by performing anchor node operations for the neighboring wireless nodes to maintain network synchronization, for example, while one or more of the neighboring wireless nodes enter a hibernation state.

Figure 4A:
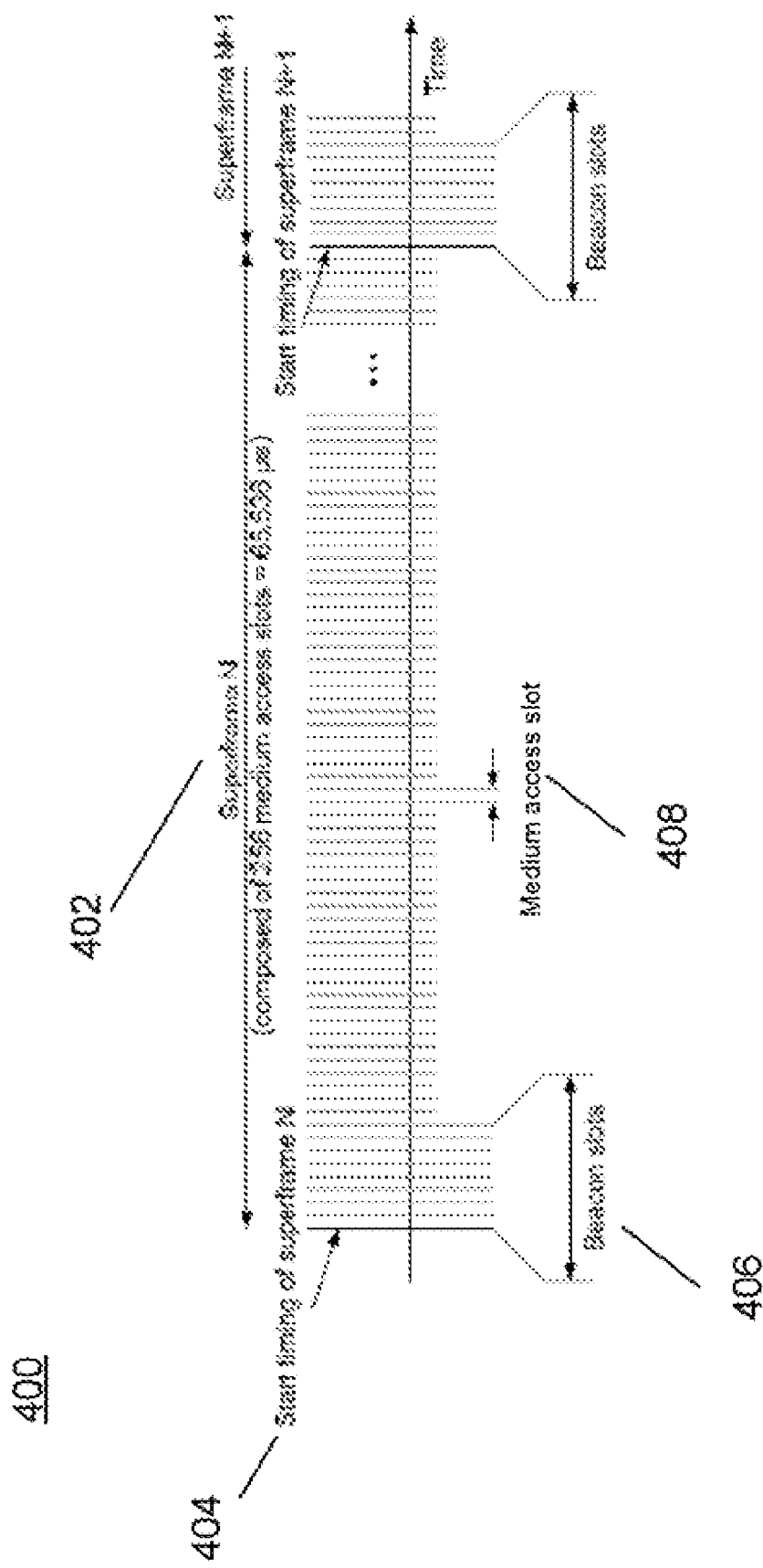
FIGS. 4a-4b is a diagram illustrating operation of transmission of superframes on a medium in a wireless network according to an example embodiment.
Figure 4B:
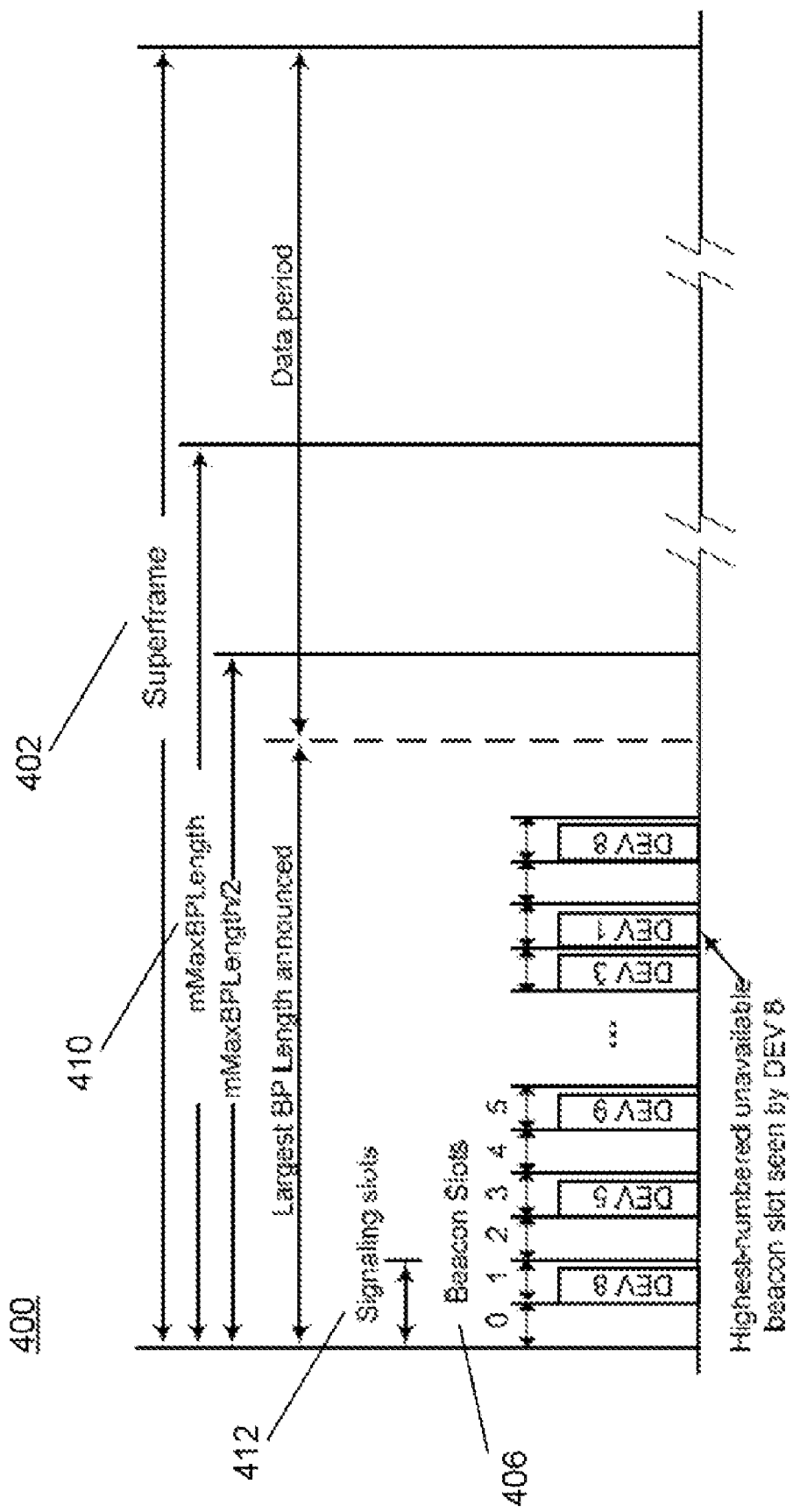

In an example WiMedia network, a basic timing structure for frame exchange may include a superframe. FIGS. 4a-4b depict operations of transmission of superframes on a medium in a wireless network according to an example embodiment.

For example, a duration of an example superframe N 402 may be specified as mSuperframeLength. The superframe N 402 may include a start timing 404 which may be referred to as a beacon period start time (BPST).

The superframe may include multiple medium access slots (MASs) 408, wherein each MAS duration may have a length of mMASLength. In the example of FIG. 4a, the superframe N 402 is shown as including of 256 medium access slots (MASs) 408, although any desired number of MASs may be included in a superframe generally.

Each superframe may start with a beacon period (BP), which may extend over one or more contiguous MASs, which may be referred to as beacon slots 406. The start of the first MAS in the BP, and the superframe, may thus be the beacon period start time (BPST).

According to an example embodiment, each superframe 402 may start with a BP, which may include a maximum length of mMaxBPLength beacon slots 410. The first mSignalSlotCount beacon slots of a BP may be referred to as signaling slots 412 and may be used to extend the BP length of neighbors. An active mode device may, for example, transmit a beacon in the BP and listen for neighbor's beacons in all beacon slots specified by its BP length in each superframe 402. When transmitting in a beacon slot 406, a device may start transmission of the frame on the medium at the beginning of that beacon slot 406. A device may announce its BP length, for example, measured in beacon slots, in its beacon. The announced BP length may include the device's own beacon slot and all unavailable beacon slots in the BP of the prior superframe. The announced BP length may not include more than mBpExtension beacon slots after the last unavailable beacon slot in the BP of the prior superframe. The announced BP length may not exceed mMaxBPLength 410. According to an example embodiment, power-sensitive devices may not include any beacon slots after the last unavailable beacon slot in their announced BP length.

The BP length reported by a device may vary, as new devices may become members of its extended beacon group, and as the device or other devices in its extended beacon group select a new beacon slot for beacon collision resolution or BP contraction.

According to an example embodiment, before a device transmits any frames, it may scan for beacons for at least one superframe. If the device receives no beacon frame headers during the scan, it may create a new BP and send a beacon in the first beacon slot after the signaling slots. If the device receives one or more beacon headers, but no beacon frames with a valid frame check sequence (FCS) during the scan, the device may scan for an additional superframe.

If the device receives one or more beacons during the scan, it may not create a new BP. Instead, prior to communicating with another device, the device may transmit a beacon in a beacon slot chosen from up to mBPExtension beacon slots located after the highest-numbered unavailable beacon slot it observed in the last superframe and within mMaxBPLength after the BPST. For example, as shown in FIG. 4b, beacon slot 414 may be the highest-numbered unavailable beacon slot observed by DEV 8 in the last superframe.

According to an example embodiment, if a node or device detects a beacon collision, the node or device may select a different beacon slot for its subsequent beacon transmissions, for example, from up to mBPExtension beacon slots located after the highest-numbered unavailable beacon slot it observed in the last superframe and within mMaxBPLength after the BPST. If the beacon slot selected for its beacon transmission is located beyond the BP length of any of its neighbors, for example, the node or device may also transmit the same beacon, except with a Signaling Slot bit set to one, or some other indicator, in a randomly chosen signaling beacon slot in the BP.

According to an example embodiment, due to changes in a propagation environment, mobility, or other effects, devices using two or more unaligned BPSTs may come into range, which may cause overlapping superframes. A received beacon, with a valid header check sequence (HCS) and frame check sequence (FCS), for example, that indicates a BPST that is not aligned with a device's own BPST may be referred to as an alien beacon. For example, a BP defined by the BPST and BP length of an alien beacon may be referred to as an alien BP.

Synchronization problems, for example, may cause a beacon of a fast device to appear to be an alien beacon. Thus, according to an example embodiment, a device may consider a BPST to be aligned with its own if that BPST differs from its own by less than 2xmGuardTime. A device may consider an alien BP to overlap the device's own BP if its BPST falls within the alien BP or if the alien BPST falls within its own BP.

The protocols and facilities of an example embodiment may be supported, for example, by an exchange of information between devices. Information may, for example, be broadcast in beacon frames. For each type of information, an Information Element (IE) may be defined. IEs may be included by a device, for example, in its beacon at any time or may be requested or provided using an example Probe command.

An effective example technique to extend battery life of battery powered devices may enable devices to turn off completely or reduce power for long periods of time, where a period of time may be considered to be long relative to the duration of a superframe.

Examples of power management modes in which a device can operate include an active state and a hibernation state. Devices in active mode may transmit and receive beacons in every superframe. Devices in hibernation mode may hibernate for multiple superframes and may not transmit or receive in those superframes. Additionally, devices may sleep for portions of each superframe in order to save power.

To coordinate with neighbors, a device may, for example, indicate its intention to hibernate by including a Hibernation Mode IE in its beacon. The Hibernation Mode IE may specify the number of superframes in which the device will sleep and will not send or receive beacons or any other frames.

An example embodiment may be based on an assumption that in certain environments, a battery powered device may be positioned in the presence of a mains or an AC powered device. It may be desirable that such a mains or AC powered device may handle the network synchronization on behalf of battery powered devices.

An example embodiment may be based on a goal of having at least one anchor device among a group of devices powered only by batteries. Thus, the anchor device may maintain the synchronization in the network. According to an example embodiment, the anchor role may be rotated or shifted among eligible devices to divide the power consumption.

FIG. 5 is an example format of a beacon period occupancy information element 500 included in an example beacon according to an example embodiment. The example beacon period occupancy information element (BPOIE) 500 may include a beacon slot information bitmap indicating a status of beacon slots. The example beacon period occupancy information element (BPOIE) 500 may include device address information, for example, indicating a beacon slot information bitmap indicating a status of beacon slots. Each device or node in a wireless network may always include a BPOIE in its beacon. In the BPOIE the device or node may indicate beacons received from neighbors in the previous superframe, as well as information retained based on hibernation mode rules. Thus, a receiving node receiving the BPOIE may determine all nodes from which the sending node may receive transmissions, or neighboring nodes to the ending node, and may further determine which of those neighboring nodes are currently performing anchor node operations for the wireless network (i.e., anchor nodes).

According to an example embodiment, a device operating in accordance with WiNet may include in its beacon a WiNet Identification information element (IE) that includes an Active Cycle Start Countdown (ACSC) field indicating a current point in the device's current active cycle of 256 superframes. A device may thus select a wireless node to operate as an anchor for the device, for example, for a duration of an active cycle of the device. Thus, for example, the device may enter a hibernation state while the selected anchor node may stay awake to maintain network synchronization.

A device in a wireless network such as a WiNet network may always include a Beacon Period Occupancy Information Element (BPOIE) in its beacon. In the BPOIE the device may reflect beacons received from neighbors in the previous superframe, as well as information retained based on hibernation mode rules.

According to an example embodiment, the following rules may be applied in selecting an anchor device or network node for a first wireless node in the wireless network:

Determine whether a device may act as an anchor by applying rule as follows:

Option 1: A device that is not a neighbor of an anchor may start acting as an anchor, if any of its neighbors is not included in any of its neighbors' BPOIEs.

Option 2: A device that is a neighbor of an anchor may start or continue acting as an anchor, if any neighboring anchor nodes' BPOIE in the previous superframe did not cover all the DevAddrs of the device's BPOIE.

Option 3: A device may start or continue acting as an anchor, if no neighboring nodes' BPOIE in the previous superframe covered all the DevAddrs of the device's BPOIE.

During hibernation a network device may cease all operations on the medium including transmission of beacons. Thus, network synchronization may be lost.

Therefore, an example hibernation anchor protocol may enable wireless nodes to determine a connected set of anchors such that every wireless node is either in the radio range of an anchor or is itself an anchor. Wireless nodes may select their anchors, for example, once every anchor cycle (AC) at the beginning (within the first few superframes) of that AC according to the following rules. A wireless node may start a new AC, for example, every 2wMaxLocalCycleIndex superframes starting from its GCST.

According to an example embodiment, a wireless node may include its anchor cycle weight (ACW) in a WiNet Identification IE from the first superframe of an AC until the wireless node selects an anchor. Once a wireless node selects an anchor, it may announce its selected anchor by replacing its ACW with its AnchorAddr in all further beacons transmitted in the AC.

According to an example embodiment, a wireless node may select its anchor according to the following rules:

1) A wireless node may select itself to be an anchor at any time.

2) A mains-powered device or AC-powered device may select itself to be an anchor and may announce that selection in every superframe, including the first superframe of every AC.

3) A non-anchor device or wireless node for which a neighbor is an anchor may select that neighbor to be its anchor if: (a) a set including all of the DevAddrs included in the BPOIE fields of the beacons received from all neighboring anchors includes all the DevAddrs of the device's BPOIE field or (b) the BPOIE field of a beacon received from a neighboring anchor includes all the DevAddrs of the device's BPOIE field excluding that anchor's DevAddr. If two or more neighbors of the device announce themselves to be anchors, and any of the conditions (a) or (b) is satisfied, the device may select any one of the announced anchors.

According to an example embodiment, once a wireless node selects an anchor in an AC, it may not change that selection for the rest of that AC. A wireless node may remain in active mode until the negotiation is complete regarding the selection of anchor nodes. The negotiation may be considered complete after all neighbors of the wireless node announce their AnchorAddr, which may require a duration on an order of a few superframes.

According to an example embodiment, a wireless node may select itself to be an anchor if the wireless node has not selected a neighbor to be its anchor as described in rule 3 regarding a non-anchor device or wireless node for which a neighbor is an anchor discussed above.

The wireless node may select itself to be an anchor if it has not selected a neighbor to be its anchor as described in rule 3 regarding a non-anchor device or wireless node for which a neighbor is an anchor discussed above, within wMaxCycle-Wait superframes after the start of an AC.

According to an example embodiment, a wireless node may additionally apply the following rules:

1) A wireless node that is a neighbor of an anchor may stop acting as an anchor or does not need to start operating as an anchor, if any neighboring anchor nodes' BPOIE in the previous superframe covered all the DevAddrs of the device's BPOIE.

2) If the BPOIE of the wireless node does not include all the devices in its neighbors' BPOIEs, it may choose not to participate in hibernation anchor selection.

3) A mains-powered or AC-powered wireless node should act as an anchor.

The techniques discussed herein may ensure that wireless nodes select themselves as anchors whenever a topological arrangement of the wireless network indicates an advantage in that particular selection. The connectivity in the network may thus be maintained and hibernation of the network nodes may proceed without breaking the synchronization.

Figure 6A:
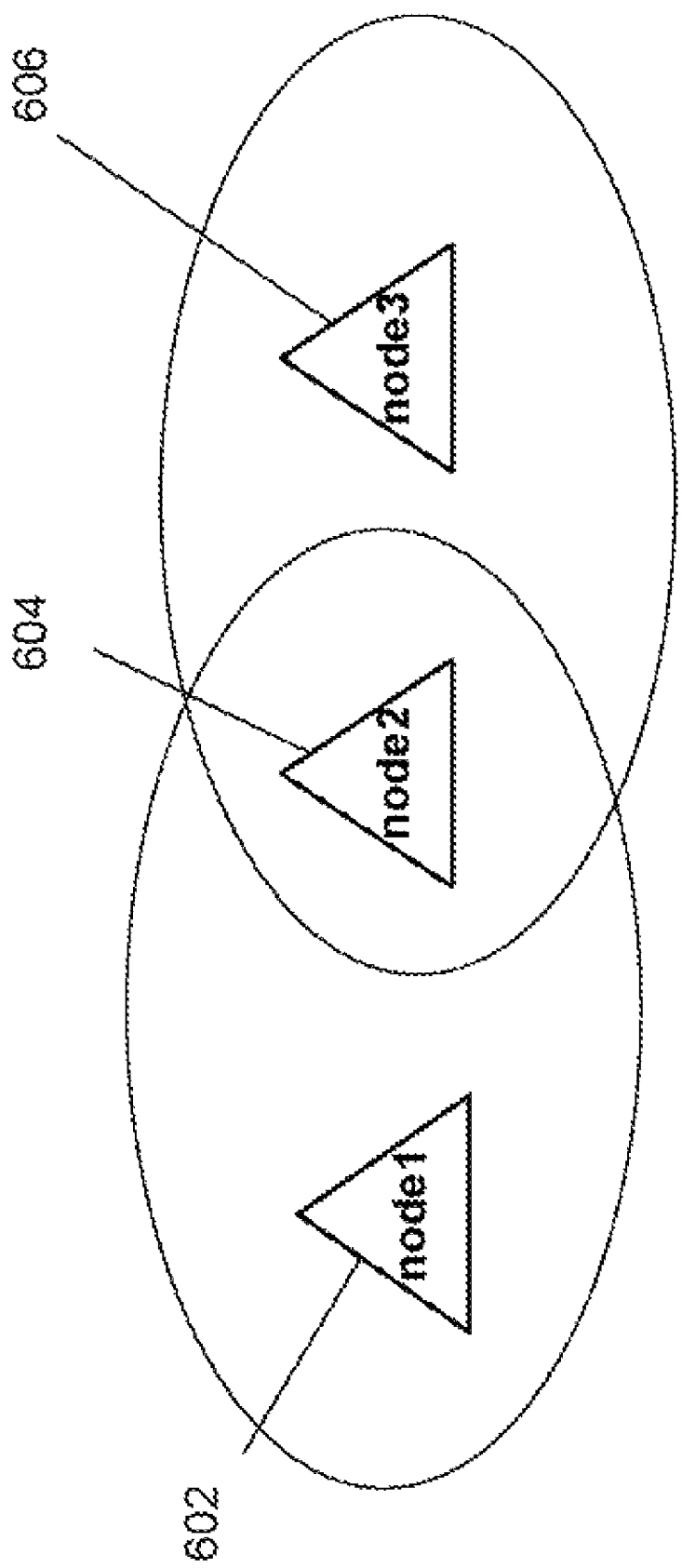
FIGS. 6a-6c depict example network topologies illustrating various selections of anchor nodes according to an example embodiment.
Figure 6B:
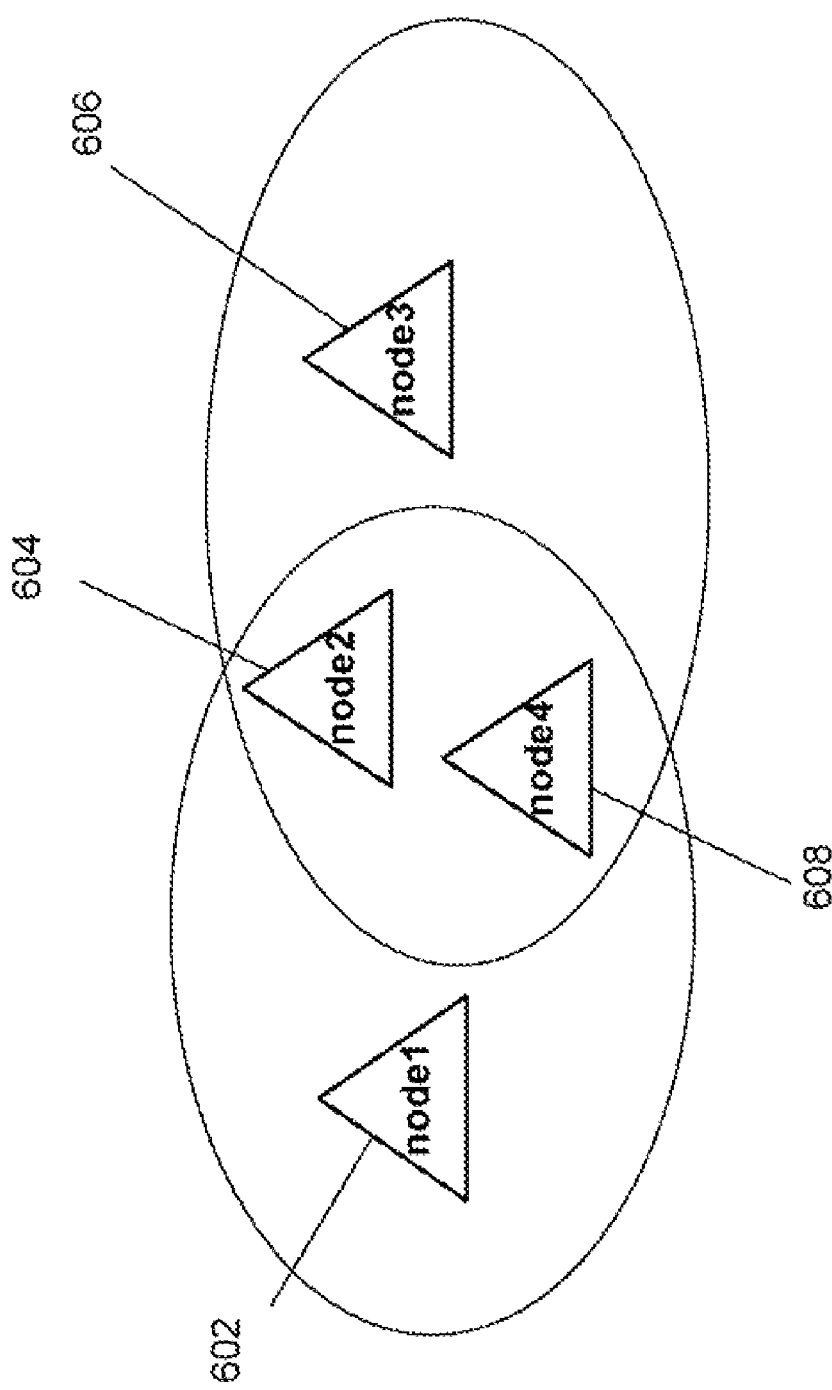
Figure 6C:
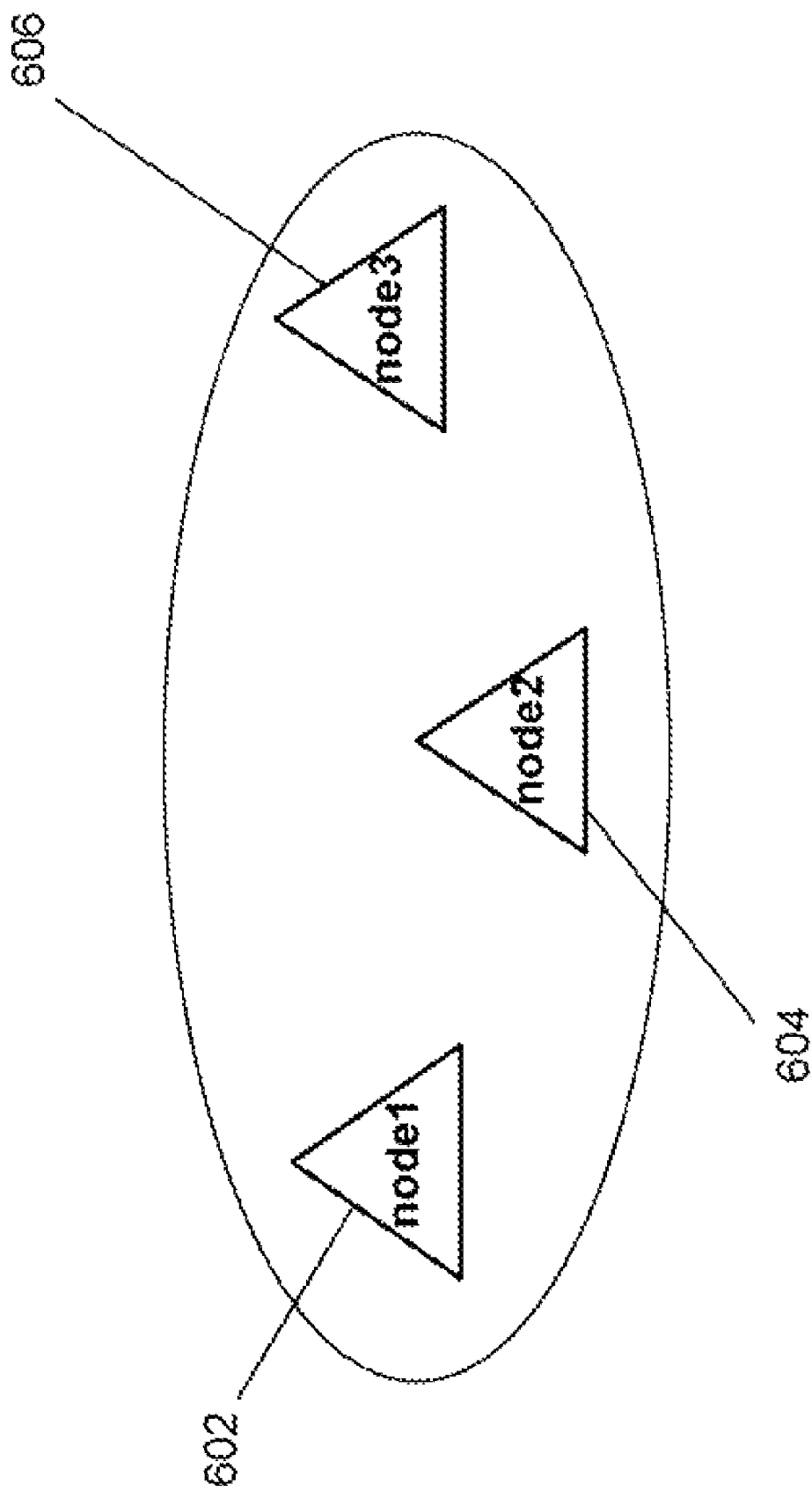

FIGS. 6a-6c depict example network topologies illustrating various selections of anchor nodes according to an example embodiment.

FIG. 6a depicts an example network topology in which three wireless nodes node1 602, node2 604, and node3 606 are arranged in a row. In the example of FIG. 6a as shown, each of the three wireless nodes was an anchor node during a previous round of anchor node selection. Each wireless node may select an anchor node according to the rules discussed previously.

Therefore, node1 602 may receive a beacon from node2 604 that includes a BPOIE that includes indicators of node1 602 and node3 606 as neighboring anchor nodes for node2 604. According to the selection rule 3-(a) discussed previously, node1 602 may not select node2 604 as its anchor, but according to rule 3-(b) it is clear that node2 604 covers node1 602's neighborhood (e.g., only node2 604 in this example). Thus, node1 602 is free to hibernate. Similarly, node3 606 is free to hibernate.

Node2 604 may receive a beacon from node1 602 that includes a BPOIE that includes an indicator of node2 604 as a neighboring anchor node for node1 602. Node2 604 may also receive a beacon from node3 606 that includes a BPOIE that includes an indicator of node2 604 as a neighboring anchor node for node3 606. According to rule 3-(a) node2 604 may not select node1 602 or node3 606 as its anchor, since their BPOIEs include only node2 604. Results of applying rule 3-(b) indicate a similar result: node1 602 does not cover node3 606 and vice versa. Thus, node2 604 may be selected as an anchor.

FIG. 6b depicts an example network topology including four wireless nodes node1 602, node2 604, node3 606, and node4 608. In the example of FIG. 6b as shown, each of the four wireless nodes was an anchor node during a previous round of anchor node selection. Each wireless node may select an anchor node according to the rules discussed previously.

Therefore, node1 602 may receive a beacon from node2 604 that includes a BPOIE that includes indicators of node1 602, node3 606, and node4 608 as neighboring anchor nodes for node2 604. Node1 602 may also receive a beacon from node4 608 that includes a BPOIE that includes indicators of node1 602, node2 604, and node3 606 as neighboring anchor nodes for node2 604. According to rule 3-(a) node1 602 may select either node2 604 or node4 608 as its anchor, since the set of indicators of neighboring nodes included in their BPOIEs covers node1 602's neighbors (i.e., node2 604 and node4 608). According to rule 3-(b) a similar conclusion may be reached. Thus, node1 602 is free to hibernate, as is node3 606.

Node2 604 may receive a beacon from node1 602 that includes a BPOIE that includes indicators of node2 604 and node4 608 as neighboring anchor nodes for node1 602. Node2 604 may also receive a beacon from node3 606 that includes a BPOIE that includes indicators of node2 604, and node4 608 as neighboring anchor nodes for node3 606. Node2 604 may also receive a beacon from node4 608 that includes a BPOIE that includes indicators of node1 602, node2 604, and node3 606 as neighboring anchor nodes for node4 608. Two alternatives may then be considered: either node1 602 and/or node3 606 is still an anchor node, or either node1 602 and/or node3 606 is no longer an anchor node.

If node1 602 and/or node3 606 is still an anchor node, then rule 3-(a) may be applied for node2 604, which indicates that the set of indicators of the BPOIEs of node1 602 and node4 608, or the set of indicators of the BPOIEs of node3 606 and node4 608 cover node2 604 and its neighbors. Additionally, if rule 3 (b) is applied, node4 608 may be indicated as covering node2 604 and its neighbors. Node3 606 may then be free to hibernate, if desired.

If either node1 602 and/or node3 606 is no longer an anchor node, then rule 3-(a) may be applied for node2 604, which indicates that the set of indicators of the BPOIEs of node4 608 does not cover enough. However, if rule 3 (b) is applied, node4 608 may be indicated as covering node2 604 and its neighbors. Node3 606 may then be free to hibernate, if desired.

FIG. 6c depicts an example network topology including three wireless nodes node1 602, node2 604, and node3 606, all within the same range. In the example of FIG. 6c as shown, each of the three wireless nodes was an anchor node during a previous round of anchor node selection. Each wireless node may select an anchor node according to the rules discussed previously.

Therefore, node1 602 may receive a beacon from node2 604 that includes a BPOIE that includes indicators of node1 602 and node3 606 as neighboring anchor nodes for node2 604. Node1 602 may also receive a beacon from node3 606 that includes a BPOIE that includes indicators of node1 602 and node2 604 as neighboring anchor nodes for node3 606. According to rule 3-(a) node1 602 may select either node2 604 or node3 606 as its anchor, since the set of indicators of neighboring nodes included in their BPOIEs covers node1

602's neighbors (i.e., node2 604 and node4 608). A similar conclusion may be reached by applying rule 3-(b). Thus, node1 602 is free to hibernate.

Thus, anchor nodes may be selected based on network topology such that network synchronization may be maintained via neighboring anchor nodes in the network.

Figure 7:
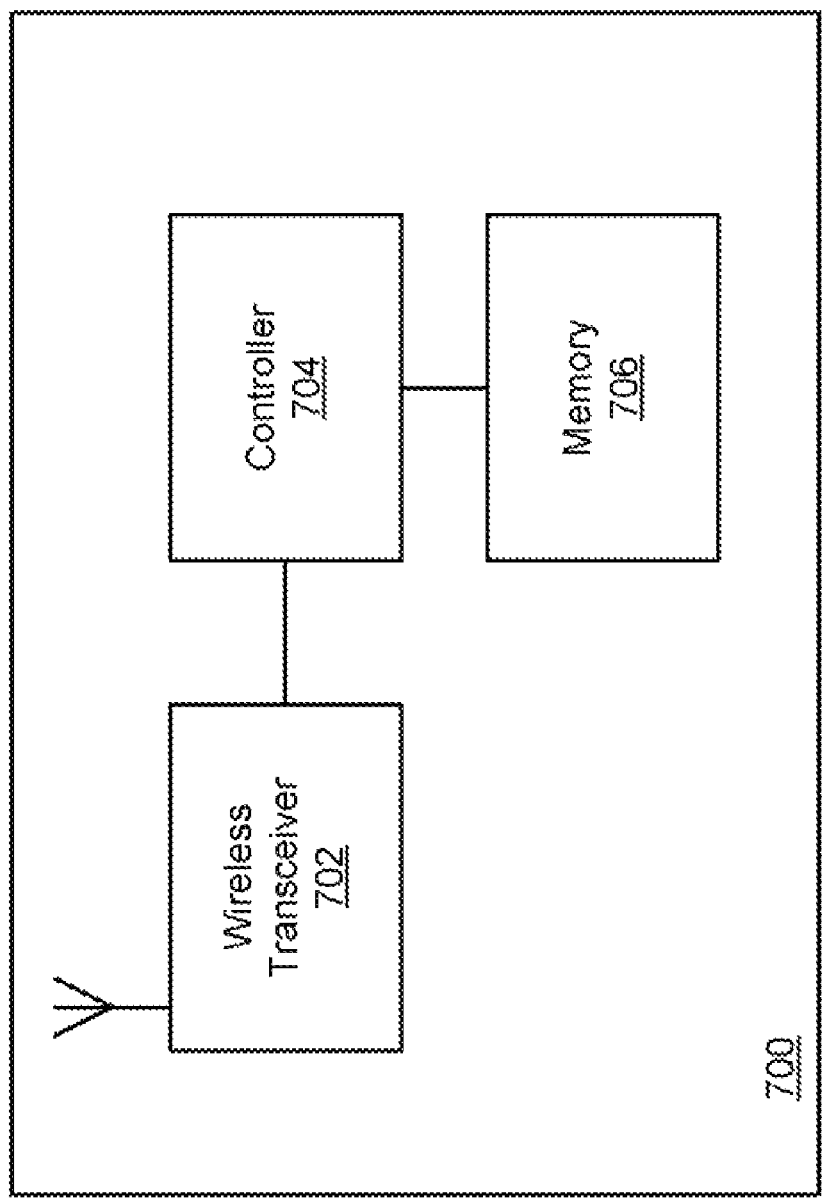
FIG. 7 is a block diagram illustrating an apparatus that may be provided in a wireless station according to an example embodiment.

FIG. 7 is a block diagram illustrating an apparatus 700 that may be provided in a wireless station according to an example embodiment. The wireless station may include, for example, a wireless transceiver 702 to transmit and receive signals, a controller 704 to control operation of the station and execute instructions or software, and a memory 706 to store data and/or instructions. Controller 704 may be programmable, and capable of executing software or other instructions stored in memory or on other computer media to perform the various tasks and functions described above. In addition, a storage medium or computer readable medium may be provided that includes stored instructions, that, when executed by a controller or processor, may result in the controller (e.g., the controller 704) performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or computer readable medium or in a propagated signal, for execution by, or to control the operation of, a data processing apparatus, e.g., a programmable processor or multiple processors, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   determining by a first wireless node a topological arrangement of the first wireless node and one or more other wireless nodes neighboring to the first wireless node in a wireless network,
   wherein a basis for determination of the topological arrangement includes:
      receiving at least one beacon transmission from each of the one or more other wireless nodes neighboring to the first wireless node,
      wherein the beacon transmission includes information identifying the neighboring wireless node originating the beacon transmission and other nodes of the wireless network known to said neighboring wireless node with indications of nodes determined as anchor nodes performing anchor node operations; and
   selecting a second wireless node to perform anchor node operations for the first wireless node based on the determined topological arrangement;
   wherein the determining the topological arrangement comprises:
      determining by the first wireless node a first set of one or more wireless nodes other than the first wireless node that is in a receiving range of the first wireless node, the first set including a first neighboring anchor node, and
      receiving from the first neighboring anchor node by the first wireless node one or more indicators indicating a second set of one or more wireless nodes that is in a receiving range of the first neighboring anchor node;
   wherein receiving from the first neighboring anchor node by the first wireless node one or more indicators indicating a second set of one or more wireless nodes that is in a receiving range of the first neighboring anchor node comprises receiving by the first wireless node a beacon from the first neighboring node; and
   wherein the beacon includes a beacon period occupancy information element (BPOIE) including one or more indicators of wireless nodes that are in a receiving range of the first neighboring node.

2. The method of claim 1 wherein: the second wireless node comprises one of the wireless nodes neighboring to the first wireless node.

3. The method of claim 1 wherein: the second wireless node comprises the first wireless node.

4. The method of claim 1 wherein: the selecting the second wireless node to perform anchor node operations for the first wireless node based on the determined topological arrangement comprises: the first wireless node selecting itself as the second wireless node to perform anchor node operations for the first wireless node based on the determined topological arrangement.

5. The method of claim 1 wherein: the wireless network comprises a WiNet network.

6. The method of claim 1 wherein: the beacon includes one or more indicators of wireless nodes that are in a receiving range of the first neighboring node.

7. The method of claim 1 wherein: selecting the second wireless node to perform anchor node operations for the first wireless node comprises: selecting the second wireless node to perform anchor node operations for the first wireless node based on comparing the first and second sets.

8. The method of claim 1 wherein: determining the topological arrangement comprises: determining by the first wireless node a first set of one or more wireless nodes other than the first wireless node that is in a receiving range of the first wireless node, the first set including a plurality of neighboring anchor nodes; and receiving from each of the plurality of neighboring anchor nodes by the first wireless node one or more indicators indicating a corresponding anchor node set of one or more wireless nodes that is in a receiving range of the corresponding neighboring anchor node.

9. The method of claim 8 wherein: selecting the second wireless node to perform anchor node operations for the first wireless node comprises: selecting the second wireless node to perform anchor node operations for the first wireless node based on comparing the first set with the corresponding anchor node sets.

10. A method comprising:
  determining by a first wireless node that a first set of one or more other wireless nodes including a first neighboring anchor node is in a receiving range of the first wireless node in a wireless network;
  receiving from the first neighboring anchor node by the first wireless node one or more indicators indicating that a second set of one or more wireless nodes is in a receiving range of the first neighboring anchor node,
    wherein receiving from the first neighboring anchor node includes receiving at least one beacon transmission from each of the first neighboring anchor node, wherein the beacon transmission includes:
      information identifying the first neighboring wireless node originating the beacon transmission and other nodes of the wireless network known to said first neighboring wireless node with indications of nodes determined as anchor nodes performing anchor node operations, and
      a beacon period occupancy information element (BPOIE) including one or more indicators of wireless nodes that are in a receiving range of the first neighboring node; and
  selecting a second wireless node to perform anchor node operations for the first wireless node based on comparing the first and second sets.

11. The method of claim 10 wherein: selecting the second wireless node comprises the first wireless node selecting itself as the second wireless node to perform anchor node operations for the first wireless node based on comparing the first and second sets.

12. The method of claim 10 wherein: selecting the second wireless node comprises selecting the second wireless node to perform anchor node operations for the first wireless node based on determining whether each of the wireless nodes included in the first set is in a receiving range of the first neighboring anchor node based on comparing the first and second sets.

13. The method of claim 10 wherein: selecting the second wireless node comprises selecting the second wireless node to perform anchor node operations for the first wireless node based on determining whether each of the wireless nodes included in the first set other than the first neighboring node is in a receiving range of the first neighboring anchor node based on comparing the first and second sets.

14. The method of claim 10 further comprising: receiving from a second neighboring anchor node by the first wireless node one or more indicators indicating that a third set of one or more wireless nodes is in a receiving range of the second neighboring anchor node, wherein the second neighboring anchor node is in a receiving range of the first wireless node, and wherein the selecting the second wireless node comprises selecting the second wireless node to perform anchor node operations for the first wireless node based on comparing the first, second, and third sets.

15. The method of claim 14 wherein: selecting the second wireless node comprises selecting the second wireless node to perform anchor node operations for the first wireless node based on determining whether each of the wireless nodes included in the first set is in a receiving range of the first or second neighboring anchor nodes based on comparing the first, second, and third sets.

16. The method of claim 14 further comprising: receiving from a third neighboring anchor node by the first wireless node one or more indicators indicating that a fourth set of one or more wireless nodes is in a receiving range of the third neighboring anchor node, wherein the third neighboring anchor node is in a receiving range of the first wireless node, and wherein the selecting the second wireless node comprises selecting the second wireless node to perform anchor node operations for the first wireless node based on determining whether each of the wireless nodes included in the first set is in a receiving range of the first, second, or third neighboring anchor nodes based on comparing the first, second, third, and fourth sets.

17. The method of claim 10 wherein: the second wireless node includes the first neighboring anchor node.

18. The method of claim 10 wherein: the second wireless node includes the first wireless node.

19. The method of claim 10 wherein: the wireless network includes a distributed wireless network, wherein control of the wireless network is distributed among the wireless nodes included in the wireless network.

20. The method of claim 10 wherein: the selecting the second wireless node comprises the first wireless node selecting itself to perform anchor node operations for the first wireless node based on: making a determination by the first wireless node to not select a wireless node neighboring to the first wireless node to perform anchor node operations for the first wireless node based on comparing the first and second sets.

21. An apparatus for wireless communications, the apparatus comprising:
  a controller;
  a memory coupled to the controller; and
  a wireless transceiver coupled to the controller;
  the apparatus configured to:
    determine a topological arrangement of the apparatus and one or more other wireless nodes neighboring to the apparatus in a wireless network
    wherein a basis for determination of the topological arrangement includes:
      receiving at least one beacon transmission from each of the one or more other wireless nodes neighboring to the first wireless node,
      wherein the beacon transmission includes information identifying the neighboring wireless node originating the beacon transmission and other nodes of the wireless network known to said neighboring wireless node with indications of nodes determined as anchor nodes performing anchor node operations, and
    select a wireless node to perform anchor node operations for the apparatus based on the determined topological arrangement;
  wherein the apparatus is configured to determine the topological arrangement based on:
    determining a first set of one or more wireless nodes other than the apparatus that is in a receiving range of the apparatus, the first set including a first neighboring anchor node, and
    receiving from the first neighboring anchor node one or more indicators indicating a second set of one or more wireless nodes that is in a receiving range of the first neighboring anchor node;
  wherein the apparatus is configured to receive from the first neighboring anchor node one or more indicators indicating a second set of one or more wireless nodes that is in a receiving range of the first neighboring anchor node based on receiving a beacon from the first neighboring node; and
  wherein the beacon includes a beacon period occupancy information element (BPOIE) including one or more indicators of wireless nodes that are in a receiving range of the first neighboring node.

22. The apparatus of claim 21 wherein: the selected wireless node comprises one of the wireless nodes neighboring to the first wireless node.

23. The apparatus of claim 21 wherein: the selected wireless node comprises the apparatus.

24. The apparatus of claim 21 wherein: the wireless network comprises a WiNet network.

25. The apparatus of claim 21 wherein: the beacon includes one or more indicators of wireless nodes that are in a receiving range of the first neighboring node.

26. The apparatus of claim 21 wherein: the apparatus is adapted to determine the topological arrangement based on: determining a first set of one or more wireless nodes other than the apparatus that is in a receiving range of the apparatus, the first set including a plurality of neighboring anchor nodes, and receiving from each of the plurality of neighboring anchor nodes one or more indicators indicating a corresponding anchor node set of one or more wireless nodes that is in a receiving range of the corresponding neighboring anchor node.

27. The apparatus of claim 26 wherein: the apparatus is adapted to select the wireless node to perform anchor node operations for the apparatus based on comparing the first set with the corresponding anchor node sets.

28. An apparatus for wireless communications, the apparatus comprising:
a controller;
a memory coupled to the controller; and
a wireless transceiver coupled to the controller;
the apparatus configured to:
determine that a first set of one or more wireless nodes including a first neighboring anchor node is in a receiving range of the apparatus in a wireless network,
receive from the first neighboring anchor node one or more indicators indicating that a second set of one or more wireless nodes is in a receiving range of the first neighboring anchor node, and
wherein the apparatus is configured to receive from the first neighboring anchor node by receiving at least one beacon transmission from each of the first neighboring anchor node,
wherein the beacon transmission includes:
information identifying the first neighboring wireless node originating the beacon transmission and other nodes of the wireless network known to said first neighboring wireless node with indications of nodes determined as anchor nodes performing anchor node operations, and
a beacon period occupancy information element (BPOIE) including one or more indicators of wireless nodes that are in a receiving range of the first neighboring node; and
select one of the wireless nodes included in the first or second sets to perform anchor node operations for the apparatus based on comparing the first and second sets.

29. The apparatus of claim 28 wherein: the selected wireless node comprises the apparatus.

30. The apparatus of claim 28 wherein: the apparatus is adapted to select the wireless node to perform anchor node operations for the apparatus based on determining whether each of the wireless nodes included in the first set is in a receiving range of the first neighboring anchor node based on comparing the first and second sets.

31. The apparatus of claim 28 wherein: the apparatus is adapted to select the wireless node to perform anchor node operations for the apparatus based on determining whether each of the wireless nodes included in the first set other than the first neighboring node is in a receiving range of the first neighboring anchor node based on comparing the first and second sets.

32. The apparatus of claim 28 further adapted to: receive from a second neighboring anchor node one or more indicators indicating that a third set of one or more wireless nodes is in a receiving range of the second neighboring anchor node, wherein the second neighboring anchor node is in a receiving range of the apparatus, and wherein the apparatus is adapted to select the wireless node to perform anchor node operations for the apparatus based on comparing the first, second, and third sets.

* * * * *